United States Patent [19]

Peter et al.

[11] Patent Number: 4,958,947
[45] Date of Patent: Sep. 25, 1990

[54] AXIAL ROLLING BEARING

[75] Inventors: Heinz Peter, Dittelbrunn; Rainer Schurger, Schwanfeld, both of Fed. Rep. of Germany

[73] Assignee: SKF GmbH, Schweinfurt, Fed. Rep. of Germany

[21] Appl. No.: 387,709

[22] Filed: Jul. 31, 1989

[30] Foreign Application Priority Data

Aug. 3, 1988 [DE] Fed. Rep. of Germany ....... 8809903

[51] Int. Cl.5 ............................................. F16C 19/10
[52] U.S. Cl. .................................... 384/609; 384/611; 384/617; 277/174
[58] Field of Search ........ 384/477, 489, 607, 609-622; 277/174, 176, 182, 184

[56] References Cited

U.S. PATENT DOCUMENTS

| 2,168,342 | 8/1939 | Horrocks | 384/622 X |
| 2,535,288 | 12/1950 | Honkanen | 277/174 X |
| 2,686,510 | 8/1954 | Platner | 277/177 X |
| 3,001,385 | 9/1961 | Allen | 277/174 X |
| 3,972,574 | 8/1976 | Pitner | 384/621 |

FOREIGN PATENT DOCUMENTS 2118134 10/1972 Fed. Rep. of Germany .
1324691 3/1963 France .................................. 384/618

Primary Examiner—Thomas R. Hannon
Attorney, Agent, or Firm—Rosen, Dainow & Jacobs

[57] ABSTRACT

An axial deep groove ball bearing is disclosed. This rolling bearing has a housing ring with a fastening rim located axially beyond the outer face of the housing ring. A ring of synthetic material or rubber is located between the fastening rim and a housing.

7 Claims, 1 Drawing Sheet

AXIAL ROLLING BEARING

BACKGROUND OF THE INVENTION

1. Field of the Invention

This invention concerns an axial rolling bearing, in particular an axial deep-groove ball bearing, having a housing ring with a fastening rim located axially beyond the outer face of the housing ring and having a flexible ring, for example a ring made of a synthetic material or rubber, between the fastening rim and a housing.

2. Discussion of Related Art

DE-OS 21 18 134 discloses a housing ring for axial rolling bearings with an axially-directed centering or fastening rim on its inner circumference, and a flexible ring between this centering or fastening rim and a housing. This known device has the disadvantage that the flexible ring may be destroyed by a strong radial impact.

SUMMARY OF THE INVENTION

It is an objective of the invention to create an axial rolling bearing from simple parts in which the flexible ring is secured against destruction by radial impact.

The objective is accomplished in the preferred embodiment of the invention that is described hereafter by providing the fastening rim with a sleeve connected to the housing disk, said fastening rim comprising an axial portion, a radial rim whose diameter is smaller than the diameter of the flexible ring when said flexible ring is mounted in said housing.

Thus, the surface of the radially directed rim facing the housing will contact the housing when it is subjected to a strong radial impact, which means that the flexible ring cannot be destroyed.

According to another advantageous feature of the invention, the flexible ring is installed so as to provide a predetermined tension between the axial portion of the sleeve and the housing when the rolling bearing is assembled, so that the bearing is solidly connected to the housing ring.

According to a further feature of the invention, the sleeve is equipped with a portion that is radially offset by 90° and which rests against the outer face of the housing ring. As a result, the sleeve is securely fitted to the housing ring.

BRIEF DESCRIPTION OF THE DRAWINGS

The invention is further explained hereafter by means of the description of an embodiment shown in the drawing. The drawing shows.

DETAILED DESCRIPTION OF A PREFERRED EMBODIMENT

Figure 1:
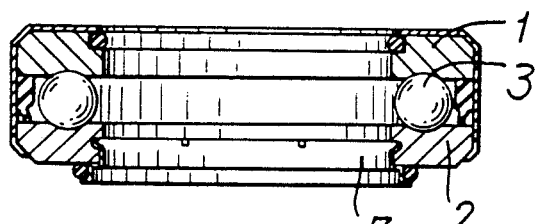
FIG. 1: A longitudinal section of an axial deep-groove ball bearing according to the invention.
Figure 2:
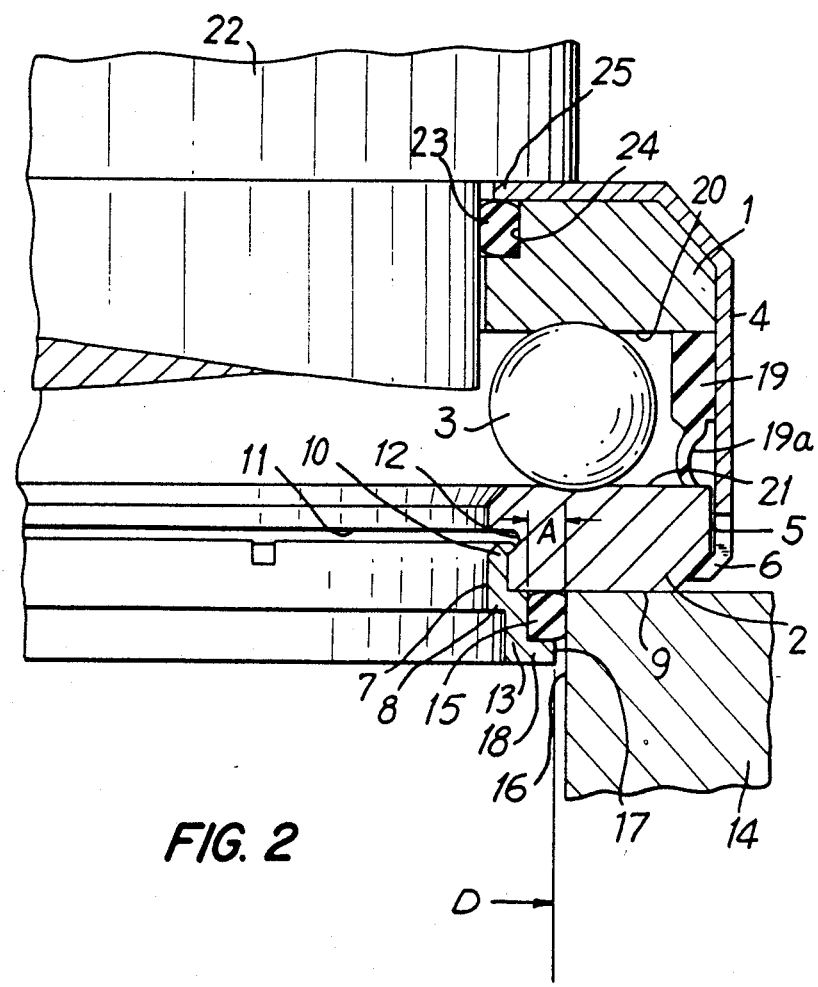
FIG. 2: A detail of the axial deep-grove ball bearing according to FIG. 1, shown on a larger scale.

The axial deep-groove ball bearing shown in FIGS. 1 and 2 has a shaft ring 1, housing ring 2, with balls 3 between the bearing rings 1, 2, and a casing of sheet metal. The casing 4 is associated with the shaft ring 1 and surrounds, with room for play, the casing surface 5 of the housing ring 2. Several discharge grooves 6 distributed around the casing's circumference ensure that grease can freely leave the bearing unhampered following lubrication of the bearing. The bore of the housing ring 2 contains a sleeve 7 which has a portion 8 that is offset at 90° resting against the outer face 9 of the housing ring 2. The axial positioning of the sleeve 7 is determined by portions 10 of the sleeve 7 which protrude outward beyond the rim 11 into a circular snap ring groove 12 in the housing ring 2. An axial portion 13 of the sleeve 7 extends beyond the outer face 9 of the housing ring 2 that forms the fastening rim at a distance from the housing 14 designated as "A". Between the axial portion 13 of the sleeve 7 and the housing 14, a ring 15, made of a synthetic material or rubber, is installed with predetermined radial tension so that the axial deep-groove ball bearing is solidly connected in a radial direction with the bore 16 of the housing 14, and any radial impact on the bearing will elicit a flexible response. In addition, the bearing rings 1, 2 can be aligned with one another in a radial direction so that no binding will occur between them and the balls 3.

To prevent the destruction of the flexible ring 15 by a strong radial impact, the sleeve has an end stop. The end stop consists of a radial rim 18 with a circumferential surface 17, whose diameter D is smaller than the diameter of the flexible ring 15 when it is compressed by the housing 14 in the assembled bearing. In addition, the flexible ring 15 seals the bearing so that no water vapor or dirt can penetrate the bearing via the gap separating the face 9 of the housing ring 2 and housing 14. A sealing ring 19 installed on the inner surface 20 of the shaft ring 1 facing the balls 3, rests with a sealing lip 19a against the adjoining inner face 21 of the housing disk 2, thereby providing a seal between the bearing rings 1, 2.

The gap separating the shaft 22 and the shaft ring 1 is sealed by a ring 23 of a flexible material that is installed in an interior recess 24 of the shaft ring 1 and is secured against falling out by a projecting portion 25 of the casing 4.

The invention is not limited to the embodiment shown. Changes in the construction of the individual components are certainly possible within the scope of the invention. For example, the invention can also be used in an axial tapered pin rolling bearing.

We claim:

1. An axial rolling bearing comprising:
   a housing ring having an outer face and a fastening rim portion located axially beyond the outer face of the housing ring;
   a sleeve fitted into the housing ring and cooperating with said fastening rim, said sleeve having an axial portion that includes a radial rim;
   a flexible ring, said radial rim having a maximum diameter that is smaller than the maximum diameter of said flexible ring when said flexible ring is mounted on said sleeve;
   a housing for said rolling bearing; and
   said flexible ring providing a predetermined radial tension between the axial portion of the sleeve and the housing.

2. The axial rolling bearing of claim 1 wherein the sleeve includes an offset portion that is offset at 90 degrees and rests against the outer face of the housing ring.

3. The axial rolling bearing of claim 1 wherein said bearing is a deep-groove ball bearing.

4. The axial rolling bearing of claim 1 wherein said flexible ring is made of synthetic material.

5. The axial rolling bearing of claim 1 wherein said flexible ring is made of rubber.

6. An axial rolling bearing comprising:

a housing ring having an outer face and a fastening rim portion located axially beyond the outer face of the housing ring;

a sleeve fitted into the housing ring and cooperating with said fastening rim, said sleeve having an axial portion that includes a radial rim;

a flexible ring, said radial rim having a maximum diameter that is smaller than the maximum diameter of said ring when said flexible ring is mounted on said axial portion of the sleeve inside said housing ring;

a housing for said rolling bearing; and said flexible ring providing a predetermined radial tension between the axial portion of the sleeve and the housing.

7. The axial rolling bearing of claim 6 wherein the flexible ring is pressed against said housing and said housing ring when said flexible ring is mounted on said axial portion of the sleeve inside said housing.

* * * * *